United States Patent [19]

Lin

[11] Patent Number: 5,523,069
[45] Date of Patent: Jun. 4, 1996

[54] CARBONYL SULFIDE ABATEMENT IN FLUIDS

[75] Inventor: M. Linda Lin, Naperville, Ill.

[73] Assignee: Nalco Fuel Tech, Naperville, Ill.

[21] Appl. No.: 147,624

[22] Filed: Nov. 5, 1993

[51] Int. Cl.$^6$ ................................. B01D 53/48
[52] U.S. Cl. ............... 423/242.7; 423/224; 423/DIG. 19
[58] Field of Search .................. 208/196, 240, 208/189; 423/224, 242.7, 243.01, DIG. 19

[56] References Cited

U.S. PATENT DOCUMENTS

| | | | |
|---|---|---|---|
| 3,647,683 | 3/1972 | Kelly et al. | 208/196 |
| 3,716,620 | 2/1973 | Deschamps et al. | 423/228 |
| 4,143,119 | 3/1979 | Asperger et al. | 423/229 |
| 4,163,044 | 7/1979 | Woertz | 423/DIG. 19 |
| 4,292,293 | 9/1981 | Johnson et al. | 423/DIG. 13 |
| 4,351,812 | 9/1982 | Correll et al. | 423/242.6 |
| 4,363,215 | 12/1982 | Sharp | 423/224 |
| 4,388,194 | 6/1983 | Hills | 423/231 |
| 4,499,059 | 2/1985 | Jones et al. | 423/224 |
| 4,548,708 | 10/1985 | Schwarzer et al. | 208/196 |
| 4,808,765 | 2/1989 | Pearce et al. | 208/240 |
| 4,967,559 | 11/1990 | Johnston | 423/DIG. 19 |

FOREIGN PATENT DOCUMENTS

| | | | |
|---|---|---|---|
| 261974 | 3/1988 | European Pat. Off. | 208/240 |
| 2522279 | 12/1975 | Germany | 423/224 |
| 53-58480 | 5/1978 | Japan | 423/224 |
| 1287924 | 2/1987 | U.S.S.R. | 423/224 |

*Primary Examiner*—Michael Lewis
*Assistant Examiner*—Peter T. DiMauro
*Attorney, Agent, or Firm*—St. Onge Steward Johnston & Reens

[57] ABSTRACT

A method for removing carbonyl sulfide from fluids, particularly gases, involves contacting them with alkaline aqueous solutions containing peroxide and hindered amine. The sulfur products so formed can then be separated from the fluid. In one embodiment, gas containing carbonyl sulfide is cycled through a wet scrubber containing a solution of hydrogen peroxide and methyldiethanolamine, triethylamine, dimethylmonoethanolamine, diethylmonoethanolamine, triethanolamine, 2-amino-2-meth-yl-1-propanol, and/or 1,8-p-menthanediaminemethyldiethanolamine at a pH of about 9 to 11, e.g., about 10. Methyldiethanolamine is preferred in one embodiment. A dispersant such as a water-soluble polymer having a molecular weight of about 500 to 100,000 may optionally be employed in the solution. Abatement of greater than 90% of the carbonyl sulfide is achieved in preferred embodiments.

2 Claims, No Drawings

CARBONYL SULFIDE ABATEMENT IN FLUIDS

TECHNICAL FIELD

This invention relates to the removal of carbonyl sulfide from fluids, particularly gases such as coal-derived natural gas, geothermal vent gas, enhanced oil recovery vent gas, and Claus plant tail gas. The invention is particularly adapted to the removal of gas phase carbonyl sulfide which is subjected to scrubbing chemistry involving the trapping of the gas in a liquid, followed by its removal from the liquid.

Carbonyl sulfide is toxic, exhibiting an $LD_{50}$ in rats of 23 mg/kg. It is harmful if swallowed or absorbed through the skin, and potentially fatal if inhaled. It is extremely destructive to the tissue of mucous membranes, the upper respiratory tract, eyes, and skin. Emissions containing COS are regulated by many states, and the chemical is regulated under Federal transportation and O.S.H.A. requirements. Even where it is not stringently regulated, many companies interested in pollution control are currently seeking carbonyl sulfide abatement methods to remove the toxic gas from emissions.

BACKGROUND ART

Carbonyl sulfide, denoted COS and otherwise known as carbon oxysulfide or carbon oxide sulfide, is a colorless gas that is slightly soluble in water and explosive in air. COS is frequently found in the effluent of coke ovens of steel mills and in Claus sour gas in refineries. In these systems, COS is usually found as a component of gas mixtures containing hydrogen sulfide, carbon monoxide, hydrogen cyanide, nitrogen, carbonyl disulfide, mercaptans, and/or sulfur dioxide. Some effluents also contain large quantities of carbon dioxide.

Carbonyl sulfide is one of the most difficult sulfur compounds to remove from petroleum refinery streams and the like. It has a low boiling point similar to propane, so it cannot be readily separated therefrom by fractionation. It is relatively stable toward acidic reagents and is only slowly affected by strong alkalies such as caustic soda. Hence, previously published methods for its removal involve complex process designs and operations.

In U.S. Pat. No. 2,434,868, for example, Sample and Miller suggested that gases containing carbonyl sulfide be first treated to remove hydrogen sulfide and mercaptans, and the resulting mixture, contacted with an alkaline solution containing aluminum oxide. It has also been suggested that carbonyl sulfide be removed by oxidation in the presence of activated charcoal impregnated with alkali, treatment with derivatives of alkyl amines, and conversion to insoluble metallic sulfides by contacting with a carrier impregnated with metal compounds in the presence of an alkaline reagent (ibid.). Nishino, et al., suggested that carbonyl sulfide could be removed from a gas that does not contain oxygen by contacting the gas with an activated carbon containing a copper compound and an alkali metal and/or alkline earth metal compound (U.S. Pat. No. 4,556,547). To avoid explosions, these methods are generally limited to the abatement of COS in gases containing little or no oxygen, and several are economically unsatisfactory because of the cost of reagents employed. For the latter reason, heterogeneous catalysts such as molybdenum/aluminum oxide, silicon/aluminum oxide, and zeolites suggested for COS abatement are also often considered unfeasible.

Oakley suggested contacting COS-containing gases with an aqueous inorganic alkali solution at temperatures between 70° and 150° C. (U.S. Pat. No. 2,758,005). Holmes and Kosseim disclosed a recycling system between a stage involving the conversion of carbonyl sulfide to carbon dioxide and hydrogen sulfide in the presence of an aqueous alkaline solution in a hydrolysis zone at about 150° to 250° F., followed by absorption of the products in solutions such as aqueous solutions of alkali metal carbonates (U.S. Pat. No. 5,104,630). To achieve significant COS abatement, temperature control is critical in these methods, as well as in various scrubbing techniques, which limits their usefulness. Wet scrubbing is limited by the low solubility of COS in water and slow hydrolysis reactions.

Al-Ghawas, H.A., et al., studied the absorption of carbonyl sulfide in aqueous methyldiethanolamine (*Chem. Eng. Sci.* 44: 631–639 (1989)), but subsequently reported that the reagent was not selective for absorbing COS from gas mixtures containing hydrogen sulfide or carbon dioxide (*Chem. Eng. Sci.* 46: 665–676 (1991)). The kinetic data presented in the papers were later questioned by other investigators, who could not confirm the reported reaction rates and postulated that contaminants were present in the reaction mixtures employed (Kittel, R.J., et al., *Ind. Eng. Chem. Res.* 31: 1269–1274 (1992)).

It would be desirable to have COS abatement methods that can achieve significant COS reduction by conventional separation techniques. It would also be desirable to have COS abatement methods appropriate for the removal of low levels of COS in the presence of high concentrations of other gases that interfere with or decrease the efficiency of some of the above-described methods.

DISCLOSURE OF THE INVENTION

An object of the invention is to remove carbonyl sulfide from fluids, particularly from gases.

It is a further object of the invention to efficaciously remove carbonyl sulfide from gases using wet scrubber technology.

These and other objects are achieved by the present invention, which provides COS removal from a fluid such as a gas by contacting the gas with an alkaline aqueous solution of peroxide and a hindered amine. Hydrogen peroxide is a particularly preferred peroxide. Example hindered amines include methyldiethanolamine, triethylamine, dimethylmonoethanolamine, diethylmonoetha-nolamine, triethanolamine, 2-amino-2-methyl-1-propanol, 1,8-p-menthanediamine, and mixtures thereof; methyldie-thanolamine is preferred in one embodiment. A dispersant such as a water-soluble polymer having a molecular weight of about 500 to about 100,000 may also be added to the solution.

In one embodiment, COS is efficaciously removed from a gas by contacting the gas with a solution containing from about 0.0005 M to about 0.2 M, more narrowly from about 0.005 M to about 0.02 M, hydrogen peroxide and from about 0.0001 to about 0.10 M, more narrowly from about 0.003 M to about 0.01 M, hindered amine at a pH of about 9 to about 11, e.g., about 10. In this embodiment, where about 0.006 M methyldiethanolamine is employed with hydrogen peroxide at a concentration of about 0.012 M, for example, greater than 94% abatement of COS is achieved.

BEST MODES FOR CARRYING OUT THE INVENTION

This invention is based upon the finding that carbonyl sulfide can be abated from fluids by treating them with an oxidizing agent and an amine in an alkaline solution.

Peroxides are particularly preferred oxidizing agents. Example peroxides include hydrogen peroxide, sodium carbonate peroxide, sodium pyrophosphate peroxide, urea peroxide, sodium peroxide, and mixtures thereof. Hydrogen peroxide is especially preferred. The amount of peroxide (and amine) required depends upon the concentration of COS to be abated. Typically, the molar ratio of peroxide to COS may vary from about 1:1 to about 1:10. Higher amounts may be employed but do not improve the efficiency of peroxide use. In one embodiment, a molar ratio of peroxide to COS is about 3:1.

Typical COS abatement solutions initially contain from about 0.0005 to about 0.2 M hydrogen peroxide, more narrowly from about 0.005 M to about 0.02 M, peroxide. One embodiment employs about 0.012 M peroxide (~408 ppm). Lower concentrations of peroxide (and amine) can be employed, and are especially desirable for some field applications where longer reaction times are used preferentially over the rather high concentrations of reactants employed in laboratory experiments. In many wet scrubber situations, peroxide in the abatement solution is replenished at periodic intervals during operation.

An amine, preferably a hindered amine, is employed in the abatement solution with the peroxide. Primary and secondary amines such as monoethanolamine and diethanolamine may also enhance COS removal, but sterically-hindered tertiary amines are more favorable to the reactions. Examplary hindered amines include, but are not limited to, methyldiethanolamine (MDEA), triethylamine, dimethylmonoethanolamine (DMMEA), diethylmonoethanolamine (DEMEA), triethanolamine, 2-amino-2-methyl-1-propanol, 1,8-p-menthanediamine and the like, and mixtures thereof. Methyldiethanolamine is employed in one embodiment.

Typical initial abatement solutions contain from about 0.0001 to about 0.10 M hindered amine, more narrowly from about 0.001 M to about 0.01 M. One embodiment employs about 0.006 M methyldiethanolamine. The data in the Examples that follow show that in this embodiment, with the optimal peroxide concentrations set out above, greater than 94% abatement of COS can be achieved. In wet scrubbers, this reduction of COS can be achieved within seconds of the gas-liquid contact time. As with the peroxide replenishment, amine is typically also replenished in many wet scrubber situations.

As is apparent from the data presented in the Examples hereinafter, COS abatement can proceed in solution at neutral pH. However, significant COS decomposition is favored at alkaline pH. Preferred abatement solutions have a pH of at least about 9 to about 11. Any suitable buffer providing that pH range, preferably an inorganic buffer, can be employed such as 0.1 M borax adjusted with sodium hydroxide or hydrochloric acid, or phosphate- or carbonate-based or alkali salt buffers. Typical solutions have a pH of about 10.

Any gas-liquid contact system which insures good contact between the COS-containing gas phase and the solution containing hindered amine and peroxide can be used. In either a continuous or intermittent flow system, concurrent, countercurrent, and cross-flows can be used. The method of the invention is particularly adapted to scrubbers such as those used for wet flue gas desulfurization (FGD), wet caustic FGD scrubbers, spray-dryer dry scrubbers, Venturi scrubbers and static mixers.

Preferred COS removal methods are conducted at ambient or close to ambient temperatures. However, in some embodiments, the method is carried out at elevated temperatures, i.e., from about 80° to about 200° C.

In some embodiments, the abatement solution optionally contains a dispersant to improve the efficiency of COS removal. A suitable dispersing agent for the present invention includes the dispersants described in co-pending U.S. application Ser. No. 08/023,639 entitled "Hydrogen Sulfide Abatement in Aqueous Fluids Including Geothermal Fluids", filed Feb. 26 1993 in the names of B.N. Nimry and M.L. Lin, and in co-pending U.S. application Ser. No. 07/770,857 entitled "Hardness Suppression in Urea Solutions", filed Oct. 3, 1991, in the names of L. Dubin, et al., which are both herein incorporated in their entireties, and the dispersant references cited therein. Typical dispersants are water-soluble polymers having a molecular weight of from about 500 to about 100,000; many suitable dispersants have a molecular weight of less than 10,000. Anionic polymers are preferred in some embodiments. Example dispersants include, but are not limited to, polyacrylate, polyacrylamide, acrylate/ethylacrylate copolymers, poly(dimethyldiallyl-ammonium chloride) (polyDADMAC), and mixtures thereof. Polymers disclosed in U.S. Pat. No. 4,292,293 to Johnson and Nimry, the dislosure of which is hereby incorporated in its entirety by reference, are preferred in one embodiment.

Where employed, dispersants are added to abatement solutions in amounts effective to improve the efficiency of the process. Dispersants are typically employed in an amount from 0 to about 1,000 ppm by weight of the polymer dry weight, based on the total weight of the aqueous abatement system. One embodiment employs about $2 \times 10^{-3}$ g/ml of an acrylate/ethylacrylate copolymer.

Metal chelates such as those described in co-pending U.S. application Ser. No. 08/023,639, cited above, may also be employed in abatement solutions of this invention. Example metals include, but are not limited to, nickel, cobalt, manganese, copper, iron, calcium or magnesium; iron is preferred, especially iron (III). Where iron is employed in abatement solutions, concentrations of less than 0.0015 M ($\leq$~84 ppm) are preferred; in most embodiments, 0 to $\leq$8 ppm iron is preferred.

Typical chelants include, but are not limited to, polyamino/polycarboxylic acids and salts thereof such as nitrilotriacetic acid (NTA), N-hydroxyethylaminodiacetic acid, ethylenediaminetetraacetic acid (EDTA), N-hydroxyethylethylenediamine triacetic acid (HEDTA), diethylenetriamine pentaacetic acid, cyclohexene diamine tetraacetic acid, triethylene tetraamine hexaacetic acid and the like; aminophosphonate acids and salts thereof such as ethylene diamine tetra(methylene phosphonic acid), amino-tri(methylene phosphonic acid), diethylenetriamine penta-(methylene phosphonic acid) and the like; phosphonate acids and salts thereof such as 1-hydroxy ethylidene-1,1-diphosphonic acid, 2-phosphono ethane 1,2-dicarboxylic acid, and the like; polyhydroxy chelants such as mono-saccharides, disaccharides, sugar acids, and the like; and other polyvalent chelants including polyhydroxy/polycarboxylic chelants such as citric acid, tartaric acid, glucoheptonic acid, galactoheptonic acid, fructoheptonic acid, hexahydroxyheptonic acid, and salts thereof. Preferred embodiments employ polyamino/polycarboxylic acids such as EDTA and HEDTA.

It is an advantage of the invention that the technology involved can be easily adapted to existing equipment. The COS removal process of the invention can be utilized using existing scrubbers for acid neutralization and sulfur dioxide removal. In the prac6 tice of the invention, COS is removed simultaneously by adding the chemistry of this invention by use of spray nozzles or the like, to contact the COS-laden gas.

It is another advantage of the invention that the COS abatement method is applicable to any gaseous stream containing carbonyl sulfide in any concentration, even in very low concentrations in the order of a few parts per million. The method may be employed even when carbon dioxide is present, but, for best results, carbon dioxide abatement prior to COS removal is preferred where carbon dioxide concentrations are very high. Examples of gaseous streams which contain carbonyl sulfide include enhanced oil recovery vent gas, geothermal vent gas, coal-derived natural gas, Claus plant tail gas, and the like.

It is a further advantage of the invention that significant COS abatement, i.e., greater than 90% removal, is rapidly achieved under optimal conditions. While not wishing to be bound to any theory, the efficacy of the method may result from the favorable kinetic factors that exist in a system having multiple pathways of COS removal. In an alkaline solution, COS reacts as follows:

$$COS + OH^- \rightarrow H_2CO_2S^-$$

$$H_2CO_2S^- + H_2O \rightarrow HCO_3^- + H_2S$$

(Kittel, R.J., et al., *Ind. Eng. Chem. Res.* 31: 1262–1269 (1992)). Tertiary amines can enhance COS hydrolysis by the following mechanism:

$$COS + R_3N + H_2O \rightarrow R_3NH^+ + HCO_2S^-$$

$$HCO_2S^- + R_3N + H_2O \rightleftharpoons R_3NH^+ + HCO_3^- + HS^-$$

(ibid.). Simple hydrolysis of COS occurs as follows:

$$COS + H_2O \rightarrow H_2S + CO_2$$

H$_2$S formed in the hydrolysis of COS is oxidized via a variety of reactions. A considerable amount of research has been directed to hydrogen sulfide abatement because the gas is toxic and obnoxiously odoriferous, and numerous processes have been developed (see, for example, U.S. Pat. No. 4,361,487 to Hills and Brown, disclosing a method involving treatment with hydrogen peroxide and sodium vanadate, U.S. Pat. No. 4,710,305 to Allison and Wimberley, disclosing a method involving contact with a nitrogen halogenated triazine, and U.S. Pat. No. 4,614,644 to Lampton and Hopkins, disclosing a method involving treatment with ferric chelates containing an oxidizing agent and a water-soluble cationic polymeric catalyst). Moreover, the solubility of H$_2$S is increased in alkaline solution, and oxidation is favored at higher pH. The overall oxidation reactions in homogeneous buffered solutions are depicted as follows:

$$H_2S + \tfrac{1}{2} O_2 \rightarrow H_2O + S^0 \quad \Delta = 53 \text{ kcal}$$

$$H_2S + 2 O_2 \rightarrow H_2SO_4 \quad \Delta = 188 \text{ kcal}$$

Since the second reaction requires much more energy, it is not expected to occur at lower temperatures and pressures.

The direct stoichiometric reactions of H$_2$S oxidation are as follows:

$$H_2S \rightarrow HS^- + H^+$$

$$2 HS^- + O_2 + 2 H^+ \rightarrow 2 H_2O + 2 S$$

$$2 HS^- + 2 O_2 \rightarrow H_2O + S_2O_3^{-2}$$

$$2 HS^- + 4 O_2 \rightarrow 2 SO_4^{-2} + 2 H^+$$

In an alkaline solution, the first, third and fourth reactions are favored over the second.

Indirect stoichiometric reactions include the formation of sulfite ions:

$$S_2O_3^{-2} + 2 OH^- + O_2 \rightarrow 2 SO_3^{-2} + H_2O$$

the formation of sulfate ions:

$$HSO_2^- + O_2 \rightarrow SO_4^{-2} + H^+$$

and the formation of thiosulfate:

$$HSO_2^- + HSO_2^- \rightarrow HS_2O_3^- + OH^-$$

$$SO_3^{-2} + S^0 \; (w/OH^-, heat) \rightarrow S_2O_3^{-2}$$

as well as the formation of polysulfides and elemental sulfur. At pH >8.5, thiosulfate formation is independent of sulfide or oxygen.

Dispersed non-adherent solid products formed, including S$^0$, can be removed by filtration, centrifugation or precipitation. It is a further advantage of the invention, however, that soluble products are favored using the method, so that equipment is not readily fouled. Liquid sulfur dioxide and other products can be land-filled by downhole injection, or precipitation with limestone (CaCO$_3$) or lime (CaO or Ca(OH)$_2$), followed by separation.

EXAMPLES

The following examples are presented to further illustrate and explain the present invention and should not be taken as limiting in any regard. Unless otherwise indicated, all parts and percentages are by weight, and are based on the weight at the particular stage of the processing being described. Unless otherwise indicated, all reactions are carried out at room temperature and pressure.

COS is removed from a feed gas by bubbling the feed gas through an aqueous solution containing ferric sulfate, N-hydroxyethylethylenediamine triacetic acid (HEDTA) chelate, hydrogen peroxide, methyldiethanolamine (MDEA) hindered amine, sodium bicarbonate or borax buffer (adjusted to different pH's using NaOH or HCl), and/or a water-soluble acrylate/ethylacrylate copolymer dispersant in amounts set out below. Effluent gas phase COS and H$_2$S are monitored for 1 to 1.5 hours using gas chromatography (Perkin Elmer).

Using this procedure, solutions are prepared by first preparing buffer and adjusting its pH, secondly adding peroxide, and then adding iron chelate, dispersant and/or hindered amine. The solutions are stirred at a constant speed throughout each run. Using an initial ferric sulfate concentration of 0.0015 M (83.7 ppm), an HEDTA concentration equivalent to or lower than the iron concentration, and a peroxide concentration of 0.012 M (408 ppm) in a 0.015 M borax buffer adjusted to pH 7.24 with HCl (to a final concentration of 0.0248 M HCl), a feed gas containing 1000 to 2000 ppm COS bubbled through the solution at a rate of about 5×10$^{-4}$ to 5×10$^{-3}$ ft$^3$/min yields the results set out in Table 1 below.

TABLE 1

COS Abatement with FeHEDTA vs. Time, pH 7.24

| Time (minutes) | COS Concentration (ppm) | % COS Removed |
|---|---|---|
| 0.00 | 1576.4 | 0.00 |
| 0.22 | 1403.8 | 10.95 |
| 0.31 | 1432.7 | 9.12 |
| 0.42 | 1432.9 | 9.10 |
| 0.49 | 1423.5 | 9.70 |
| 0.55 | 1449.9 | 8.02 |
| 1.01 | 1478.6 | 8.20 |
| 1.19 | 1420.4 | 9.90 |
| 1.28 | 1410.1 | 10.55 |
| 1.33 | 1448.6 | 8.11 |

Under the same conditions, >95% of $H_2S$ is removed from a feed gas containing 1500 ppm $H_2S$. It can be seen from the data that a low (~11% or below) COS removal is observed during the first 1.25 hours under conditions of the run.

The experiment is repeated at a higher pH using a dispersant. The feed gas COS concentrations and initial ferric chelate and peroxide concentrations are the same as that set out above. The solution is buffered at pH 0.01 with $NaHCO_3$ (0.0452 M) to which NaOH is added (to a final concentration of ~0.03M). Dispersant is present at a concentration of $2.0 \times 10^{-3}$ g/l. The results set out in Table 2 below are obtained.

TABLE 2

COS Abatement with FeHEDTA vs Time, pH 10.01

| Time (minutes) | COS Concentration (ppm) | % COS Removed |
|---|---|---|
| 0.00 | 1646.8 | 0.00 |
| 0.15 | 924.1 | 43.89 |
| 0.25 | 1138.3 | 30.88 |
| 0.36 | 1113.3 | 32.40 |
| 0.45 | 1111.3 | 32.52 |
| 0.55 | 1111.5 | 32.51 |
| 1.05 | 1004.1 | 39.03 |
| 1.15 | 1125.4 | 31.66 |

An overall COS removal of about 32% is achieved, representing an increase of about 20% over the neutral reaction. In separate experiments, it is shown that the dispersant appears to have little impact on $H_2S$ or COS removal efficiency. The dispersant functions to disperse the Fe sulfide solids formed in the reaction so they do not become adherent to the walls of the treatment system.

The higher pH reaction is repeated using the same initial concentrations of ferric chelate, peroxide, and dispersant, except that a hindered amine (MDEA) is added to the solution at an initial concentration of $7.2 \times 10^{-4}$ g/l (0.006 M). The data set out in Table 3 below are obtained.

TABLE 3

COS Abatement with MDEA and FeHEDTA, pH 10.1

| Time (minutes) | COS Concentration (ppm) | % COS Removed |
|---|---|---|
| 0.00 | 1589.4 | 0.00 |
| 0.12 | 569.2 | 64.19 |
| 0.22 | 664.3 | 58.20 |
| 0.32 | 642.6 | 59.57 |
| 0.41 | 607.7 | 61.77 |
| 0.52 | 643.3 | 59.53 |

TABLE 3-continued

COS Abatement with MDEA and FeHEDTA, pH 10.1

| Time (minutes) | COS Concentration (ppm) | % COS Removed |
|---|---|---|
| 1.02 | 641.0 | 59.67 |

About a 60% COS removal is obtained. Decreasing the chelated iron content ten-fold, to about 8 ppm, increases the COS removal to about 70% under the same conditions.

The experiment is repeated at the higher pH without any added iron chelate or amine. Using the same initial concentrations of peroxide and dispersant at pH 10.03, results set out in Table 4 are obtained.

TABLE 4

COS Abatement without FeHEDTA/MDEA, pH 10.3

| Time (minutes) | Cos Concentration (ppm) | % COS Removal |
|---|---|---|
| 0.00 | 1261.0 | 0.00 |
| 0.10 | 411.8 | 67.34 |
| 0.19 | 367.8 | 70.83 |
| 0.30 | 352.2 | 72.07 |
| 0.43 | 339.0 | 73.12 |
| 0.57 | 313.4 | 75.15 |

The COS removal rate is increased to about 72%. A high load of Fe-HEDTA thus appears negative to COS reduction.

Removal of the iron chelate in the system while maintaining hydrogen peroxide increases COS removal substantially. The higher pH COS removal reaction is repeated using the same concentrations of peroxide and MDEA described above, but without iron chelate. Results set out in Table 5 are obtained.

TABLE 5

COS Abatement with MDEA vs. Time, pH 10.1

| Time (minutes) | Cos Concentration (ppm) | % COS Removed |
|---|---|---|
| 0.00 | 1595.9 | 0.00 |
| 0.12 | 156.9 | 90.17 |
| 0.22 | 113.7 | 92.88 |
| 0.32 | 114.1 | 92.85 |
| 0.42 | 91.9 | 94.24 |
| 0.53 | 91.9 | 94.24 |
| 1.03 | 110.4 | 93.08 |
| 1.13 | 94.2 | 94.10 |

It can be seen from the data that the hindered amine improves COS removal by about 20 to 30%. The overall COS removal is >90%.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention as defined in the appended claims. The claims are intended to cover the claimed components and steps in any sequence which is effective to meet the objectives there intended, unless the context specifically indicates the contrary.

I claim:

1. A method for removing carbonyl sulfide from a gas comprising contacting the gas with between about 0.0005 M and about 0.2 M hydrogen peroxide and between about 0.0001 M and about 0.1 M methyldiethanolamine in a buffered solution at a pH of about 10.

2. A method according to claim 1 wherein the concentration of hydrogen peroxide in the solution varies between about 0.0005 M and about 0.2 M, and the concentration of amine varies between about 0.001 M and about 0.01 M.

* * * * *